Patented May 16, 1950

2,508,324

UNITED STATES PATENT OFFICE 2,508,324

HETEROCYCLIC NITROGENOUS CYANINE DYES CONTAINING A NEW GROUP ADDED TO THE NITROGEN ATOM THEREOF

Alfred W. Anish, Vestal, N. Y., assignor to General Aniline & Film Corporation, New York, N. Y., a corporation of Delaware No Drawing. Original application September 7, 1946, Serial No. 695,559. Divided and this application November 7, 1946, Serial No. 708,473

7 Claims. (Cl. 260—240.1)

This invention relates to heterocyclic nitrogeneous cyanine dyes containing a new group attached to the nitrogen atom thereof.

Sensitizing dyes used with silver-halide emulsions must not only provide the desired sensitivity, but must meet other requirements chief of which are non-diffusibility in the emulsion and solubility in liquids used for adding the dye to the emulsion. A dye selected for its sensitizing power need not and usually does not have such other prerequisites.

It is known that variations of the structure of a sensitizing dye lead to changes in its sensitizing characteristics. Hence, if a dye be satisfactory from the standpoint of its sensitivity, but deficient from the standpoint of solubility or diffusibility, and it is attempted to cure the deficiency by the introduction of substituents changing the dye molecule, a modification of the sensitizing characteristics necessarily ensues.

It is recognized in the art that the greater the molecular weight of a product, the lower its solubility; discounting, of course, the presence of solubilizing groups. Hence, if a sensitizing dye is deficient from the standpoint of diffusibility and satisfactory from the standpoint of solubility a change in the size of the molecule to cure the deficiency causes a lessening of solubility.

It is also a truism that the characteristics of a cyanine dye will not vary greatly if the aliphatic atom grouping attached thereto is varied within limits. Thus, it is possible to use interchangeably the low molecular weight aliphatic radicals ranging up to say 4 carbon atoms without a material modification of the properties of the dye. However, if this limit be exceeded to increase the size and hence the non-diffusibility of the dye as a whole, then again we find that the dye has undergone a marked departure in properties from those of the original.

I have now discovered that by introducing one or two methylene groups between a p-toluenesulfonate group and a nitrogenous heterocyclic system, compounds are obtained which, when utilized as alkylating or quaternizing agents for basic nitrogenous heterocyclic dye intermediates usually employed in the production of sensitizing dyes, yield dye salt intermediates which undergo the usual reactions for the preparation of cyanine dyes. These dyes are characterized not only by their speed and gradation but also by non-diffusing properties in multilayer films without any sacrifice in solubility.

It is an object of the present invention to provide a new class of heterocyclic nitrogenous cyanine dyes containing a new group attached to the nitrogen atom thereof.

Other objects and advantages of this invention will become apparent by reference to the following specification in which its preferred details and embodiments are described.

I have found that when an aromatic primary amino compound, containing in addition a hydroxy, mercapto, or selenyl group in the ortho-position, is heated with glycolic or hydracrylic acid, azoles are obtained, which upon further treatment with p-toluenesulfonyl chloride, yield azole toluenesulfonic acid esters, which are excellent alkylating or quaternizing agents for basic heterocyclic nitrogenous intermediates usually employed in cyanine dyes.

The alkylating or quaternizing agents prepared according to the present invention are characterized by the following general formula:

(1)
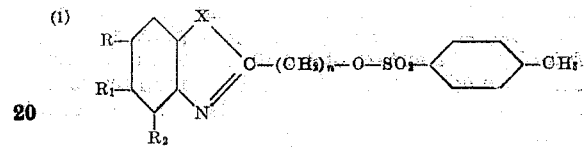

wherein R represents hydrogen, an aliphatic radical such as an alkyl group, e. g., methyl, ethyl, propyl, butyl, and the like, alkoxy, e. g., methoxy, ethoxy, propoxy, etc., halogen, e. g., chlorine or bromine, or anilino group, $R_1$ represents either hydrogen, a halogen, or an aliphatic radical of the same value as R, R and $R_1$ together represent a methylenedioxy group, $R_2$ represents either hydrogen or an aliphatic group of the same value as R, X represents either oxygen, sulfur or selenium, and $n$ represents a numeral ranging from 1 to 2.

The aromatic primary amino compounds containing a hydroxy, mercapto or selenyl group in the ortho-position and utilized as starting materials for the preparation of the above alkylating or quaternizing agents are represented by the following general formula:

(2)
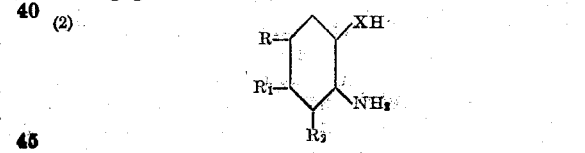

wherein R, $R_1$, $R_2$, and X have the same values as above.

As representative examples of suitable compounds represented by the above formula (2) may be mentioned: 2-amino-phenol, 2-amino phenyl mercaptan, 2-amino phenyl selenomercaptan, 2-amino-5-methoxy-phenol, 2-amino-5-ethoxy-phenyl mercaptan, 2-amino-4,5-dimethoxy-phenyl mercaptan, 2-amino-5-anilino-phenyl mercaptan, 2-amino-5-chloro-phenyl mercaptan, 2-amino-4,5-methylenedioxy-phenyl mercaptan, 2-amino-3-methyl-phenyl mercaptan, and the like.

In preparing the quaternizing agents of the present invention, a molecular equivalent of an aromatic primary amine represented by formula (2) is heated with a slight excess of a molecular equivalent of glycolic or hydracrylic acid represented by the general formula:

$$HO-(CH_2)_n-COOH$$

wherein $n$ represents a numeral ranging from 1 to 2, at a temperature ranging from 120°–155° C., for several hours. The methods of isolating the resulting product vary with the nature of the aromatic primary amino compound and the organic acid employed in the condensation reaction. In the case where the reaction mixture consists of an ortho- amino-phenyl mercaptan, or ortho- amino-phenyl selenomercaptan and glycolic acid, the product is isolated by diluting the reaction mixture with water at room temperature, and a sufficient quantity of a mild oxidizing agent such as a 3% solution of hydrogen peroxide, aqueous solution of NaOH-potassium ferricyanide, sodium peroxide, sodium perborate, oxygen, etc., is added until a solid precipitate ensues. The purpose of the oxidizing agent is to convert the unreacted phenyl mercaptan or phenyl selenomercaptan to the insoluble disulfide or diselenide. The precipitate is separated from the liquid portion of the reaction mixture, redissolved in a minimum amount of 3–N caustic soda solution, in which the 2-methylol azole is soluble, and the solution treated with a small quantity of charcoal, and the compound reprecipitated carefully by the addition of a 10% solution of acetic acid. An additional fraction of the final product may be obtained from the filtrate by salting out with sodium chloride.

Where the reaction mixture consists of an amino-phenyl mercaptan or amino-phenyl selenomercaptan, and hydracrylic acid, the unreacted portion of the amino-phenyl mercaptan, or amino-phenyl selenomercaptan, is extracted with a 4 to 10% solution of caustic soda in which the final product is insoluble, the extract rendered slightly acid, and the insoluble portion extracted with a water immiscible solvent such as ethyl ether, petroleum ether, benzene, and the like. The residue remaining after distilling off the ether is then subjected to a fractional distillation. The distillate obtained above 150° C., and 2 mm. pressure is utilized in the reaction with p-toluenesulfonyl chloride.

In the case where an aminophenol and glycolic or hydracrylic acid is used, the reaction mixture is extracted several times with ether, the extract dried with anhydrous sodium sulfate, and the ether distilled off. The oily residue remaining after distilling off the ether is subjected to a fractional distillation under reduced pressure. All of the distillate obtained above 150° C., at 2–3 mm. of pressure is mainly an alkylol benzoxazole, and utilized as such in the reaction with the p-toluenesulfonyl chloride.

One mol of the product as above obtained is dissolved in a sufficient quantity of 8–N caustic soda solution and the solution heated on a steam bath. To the hot solution, 1 mol of p-toluenesulfonyl chloride is added and the mixture allowed to stand at room temperature for 2 or more hours. The precipitated product is recovered by filtration, washed with water, the solid dried in air, and recrystallized from petroleum ether.

When a molecular equivalent of 2-aminophenyl mercaptan is heated with a slight excess of a molecular equivalent of glycolic acid and the resulting 2-methylol-benzothiazole reacted with p-toluenesulfonyl chloride, two reactions occur which may be written as follows:

(a) 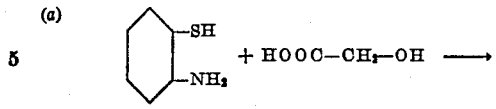

(b) 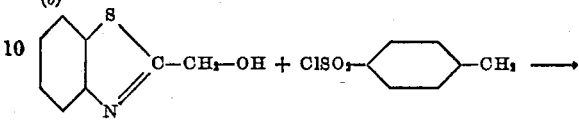

(c) 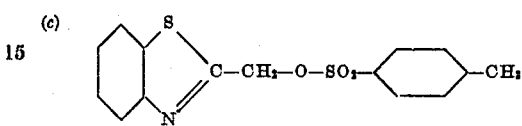

The toluenesulfonic ester (c) so prepared is then reacted with any one of the nitrogenous heterocyclic bases, usually employed in the synthesis of cyanine dyes, in the known manner, such as by heating in a sealed tube at a temperature ranging from 65° to 150° C. Another method comprises heating said ester and base at about 100° C., with a solvent-diluent, for a time sufficient for quaternization to take place.

The heterocyclic nitrogenous cyanine dye intermediates containing a new group attached to nitrogen atom thereof and prepared according to the present invention are characterized by the following general formula:

(3) 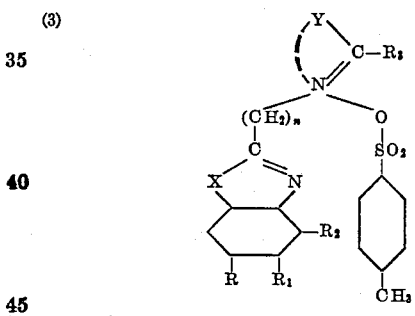

wherein R, $R_1$, $R_2$, X and $n$ have the same values as in general formula (1), $R_3$ represents a methyl group, and Y represents the atoms necessary to complete a five-membered or six-membered heterocyclic nitrogenous nucleus of the type usual in cyanine dyes such as benzoxazole, benzothiazole, benzoselenazole, indoline, indolenine, naphthoxazole, naphthiazole, oxazole, oxazoline, pyridine, quinoline, selenazole, selenazoline, thiazoline, thiodiazole, and the like.

The following examples describe in detail the method for preparing the quaternizing agents and cyanine dye intermediates quaternated with said agents, but it is to be understood that they are presented merely for the purpose of illustration and are not to be construed as limitative.

*Example I*

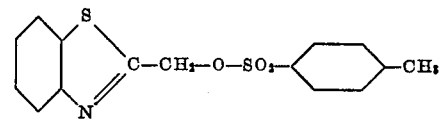

2-benzothiazolylmethyl p-toluenesulfonate

Sixty grams of 2-amino phenyl mercaptan and 42 grams of glycolic acid were heated together at 120°–155° C., for several hours. The mixture was poured into water at room temperature and 10 cc. of a 3% hydrogen peroxide solution added. The precipitate is separated from the liquid portion of the reaction mixture, redissolved in a minimum amount of 3-N caustic soda solution and filtered. A small quantity of charcoal was added, the product reprecipitated carefully by the addition of a 10% solution of acetic acid, and the solid product recovered and dried.

Sixty grams of the product as above obtained is dissolved in 500 cc. of 8-N caustic soda solution and the solution heated on a steam bath. To the hot solution 70 grams of p-toluenesulfonyl chloride was added and the mixture allowed to stand at room temperature for several hours. The precipitated product was cooled, filtered, washed with water, the solid dried in air, and recrystallized from petroleum ether.

*Example II*

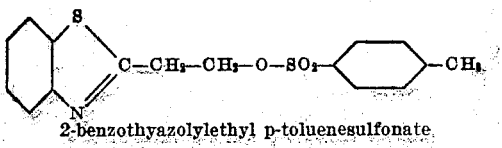

2-benzothyazolylethyl p-toluenesulfonate

Fourteen grams of 2-amino phenyl mercaptan and 11 grams of hydracrylic acid were heated together at 140°–155° C., for two hours. The gummy product, which is soluble in acid but insoluble in alkali, was extracted with a 5% solution of caustic soda so as to remove any unreacted 2-amino phenyl mercaptan. The insoluble residue was extracted several times with ethyl ether, and the residue remaining after distilling off the ether was subjected to a fractional distillation above 150° C., and at 2 mm. pressure. The distillate obtained at 165°–170° C., at 3 mm. pressure, was a yellowish-brown oil.

The yellowish-brown oil obtained as above was then reacted with p-toluenesulfonyl chloride as in Example I.

*Example III*

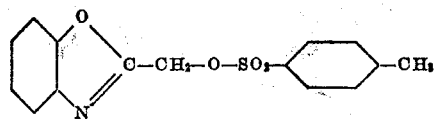

2-benzoxazolylmethyl p-toluenesulfonate

Fifty-four grams of 2-amino phenyl mercaptan and 42 grams of glycolic acid were heated together as in Example I. The reaction mixture was extracted several times with ether and then dried with anhydrous sodium sulfate. The residue remaining after distilling off the ether was subjected to fractional distillation under reduced pressure. The distillate obtained above 150° C., and at 2 mm. pressure, was mainly 2-methylol benzoxazole.

The 2-methylol benzoxazole as above obtained was then reacted with p-toluenesulfonyl chloride as in Example I.

*Example IV*

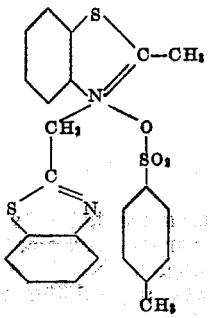

Five grams of 2-methyl benzothiazole and 5 grams of 2-benzothiazolylmethyl p-toluenesulfonate were heated together in a tube in an oil bath for 4 hours at 100° C. The crude solid was ground with an ether-acetone mixture, washed with acetone, and finally dried.

*Example V*

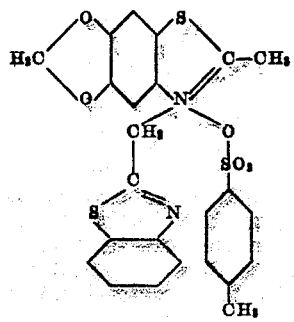

Three grams of 2-methyl-5,6-methylenedioxy benzothiazole and 5 grams of 2-benzothiazolylmethyl p-toluenesulfonate were heated together in a tube in an oil bath for 3 hours at 100° C. The crude solid was pulverized in an ether-acetone mixture and washed with acetone.

*Example VI*

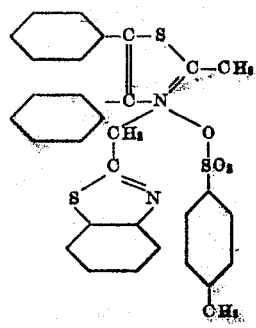

Five grams of 4,5-diphenyl-2-methyl thiazole and 5 grams of 2-benzothiazolylmethyl p-toluenesulfonate were heated together in a tube in an oil bath for 12 hours at 65°–68° C. The crude brown solid was ground with an ether-acetone mixture and finally washed with acetone. The final product decomposes at 100° C.

*Example VII*

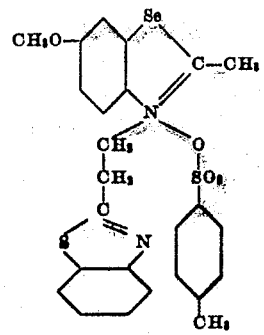

Five grams of 6-methoxy-2-methyl benzoselenazole and 5 grams of 2-benzothiazolylethyl p-toluenesulfonate were heated together in a tube in an oil bath for 12 hours at 65°–68° C. The crude product was washed with an ether-acetone mixture and then acetone in a mortar. The final product decomposes at 100° C.

Example VIII

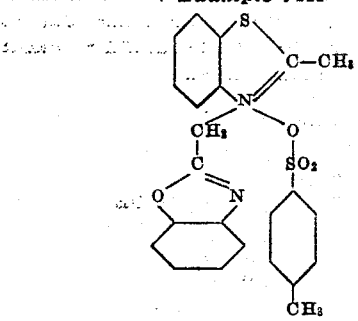

Five grams each of 2-methyl benzothiazole and 2-benzoxazolylmethyl p-toluenesulfonate were heated together in a tube in an oil bath for 4-5 hours at 100° C. The crude solid was pulverized in an ether-aectone mixture and washed with acetone.

As stated above, the preceding examples are merely illustrative of the use of my new quaternizing agents. It is to be understood that such agents are effective as quaternizing agents for any heterocyclic nitrogenous dyestuff intermediate of the type useful in preparing cyanine dyes, and irrespective of the chain length of the dyestuff, or grouping in 2-position to the nitrogen atom thereof.

Example IX

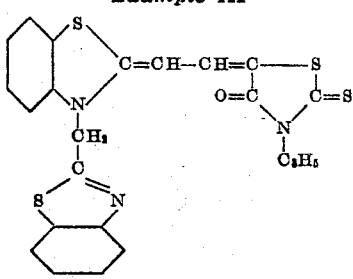

Five-tenths grams each of 5-acetanilido-3-allylmethylene rhodanine and 2-methyl-3-(2-benzothiazolyl methyl) benzthiazole p-toluenesulfonate prepared according to Example IV were dissolved in 15.0 cc. of isopropyl alcohol and refluxed in the presence of 1.0 cc. of triethylamine for 2 hours. The dye was filtered off after cooling, and boiled out twice with alcohol. Its sensitizing speed in bromoiodide emulsions is 100% greater than that of a corresponding dye having an ethyl group attached to the nitrogen atom of the benzothiazole nucleus.

Example X

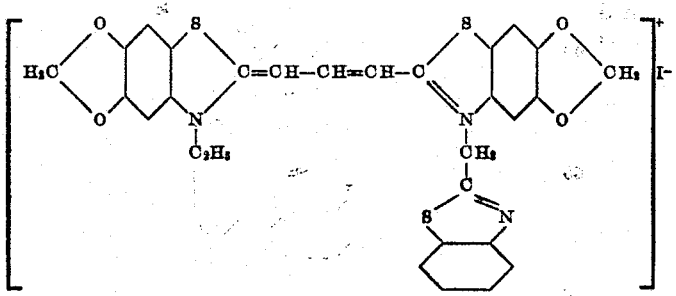

One gram each of 2-β-acetanilido vinyl-5,6-methylene-dioxy benzothiazole ethiodide and 2-methyl-5,6-methylenedioxy-3-(2 - benzothiazolyl methyl) benzothiazole p-toluenesulfonate prepared according to Example V were dissolved in 20.0 cc. of pyridine and 0.5 cc. of triethylamine added. The mixture was heated over stem for 1 hour, then cooled and filtered.

The residue on the filter was recrystallized twice from methyl alcohol. The dye sensitized a silver-bromoiodide emulsion to about 680 mμ, with a maximum at 640 mμ.

Example XI

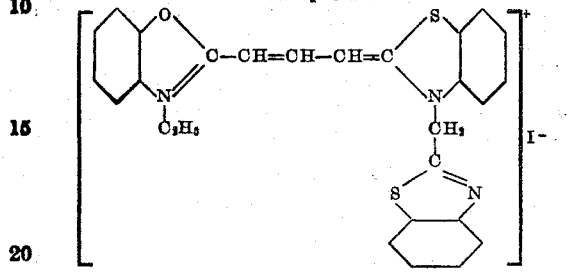

Five-tenths gram each of 2-β-acetanilido vinyl benzoxazole ethiodide and 2-methyl-3-(2-benzothiazolyl methyl) benzothiazole p-toluenesulfonate prepared according to Example IV were heated in 15.0 cc. of pyridine in the presence of 0.5 gram of triethylamine at 100° C. for 15 minutes. The reaction mixture was cooled, diluted with an equal volume of water, and allowed to stand at room temperature. The dye crystals were filtered off, boiled out with two portions of methanol and then crystallized from ethanol. The dye sensitized a silver-bromo-iodide emulsion to about 600 mμ, with a maximum at 560 mμ, and had a stronger sensitization in this type of emulsion than the corresponding dye with ethyl groups on both nitrogen atoms.

Example XII

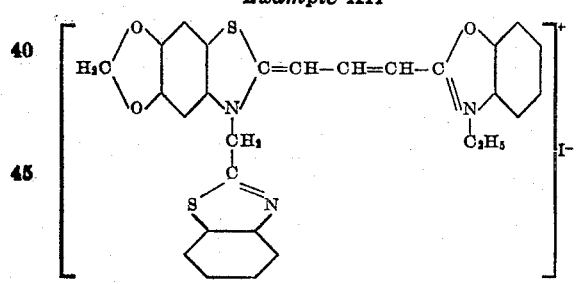

Four and three-tenths grams of 2-β-acetanilido vinyl benzoxazole ethiodide and 3.4 grams of 2 - methyl - 5,6 - methylene-dioxy-3-(2-benzothiazolyl methyl) benzothiazole p-toluenesulfonate prepared according to Example V were dissolved in 35.0 cc. of pyridine and 1.5 cc. of triethylamine added. The mixture was heated over steam for one hour, cooled and diluted liberally with water.

The crystals which separated out were filtered off and recrystallized from ethyl alcohol.

The dye sensitized a silver-bromoiodide emulsion to 620 mμ, with a maximum at 580 mμ.

Example XIII

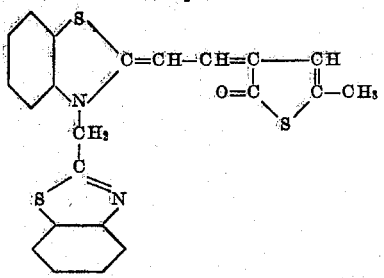

Two and six-tenths grams of 2-methyl-4-acetanilido methylene-5-oxo-thiophene and 4.7 grams of 2-methyl-3-(2-benzothiazolyl methyl) benzothiazole p-toluenesulfonate prepared according to Example IV were dissolved in 50.0 cc. of isopropyl alcohol and 0.5 cc. of triethylamine added. The mixture was refluxed for 30 minutes, and then cooled and the dye filtered off. The dye was purified by dissolving in dioxane and precipitating with alcohol.

This dye increased the light sensitivity of a photographic emulsion considerably more than the corresponding dye with an ethyl group attached to the nitrogen atom.

Example XIV

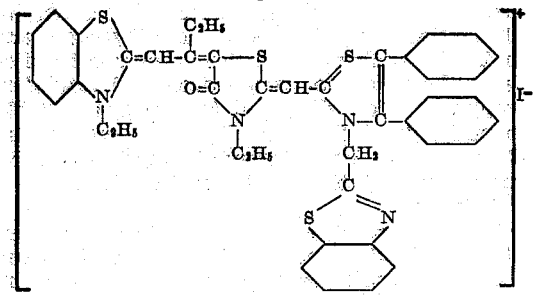

Three and nine-tenths grams of 2-$\beta$-methylmercapto vinyl benzothiazole ethiodide and 1.5 grams of 3-ethyl rhodanine were condensed by refluxing for 1 hour in 100 cc. of isopropylalcohol in the presence of 1.0 cc. of triethylamine. The dye which settled out on cooling was filtered off and reacted further without purification.

Two and five-tenths grams of the merocyanine thus prepared were alkylated with 3.0 cc. of methyl sulfate by heating together at 110° C. for 10 minutes. The reaction product was cooled, chilled, and the excess of methyl sulfate decomposed by adding pyridine.

Three and six-tenths grams of 2-methyl-4,5-diphenyl-3-(2-benzothiazolyl methyl) thiazole p-toluenesulfonate prepared according to Example VI were added and the mixture heated at 140° C. for 15 minutes. The rhodacarbocyanine dye was isolated by boiling the crude reaction product with dioxane to remove impurities and then recrystallized from methyl alcohol. The dye sensitized color film strongly with a maximum at 640 m$\mu$.

Example XV

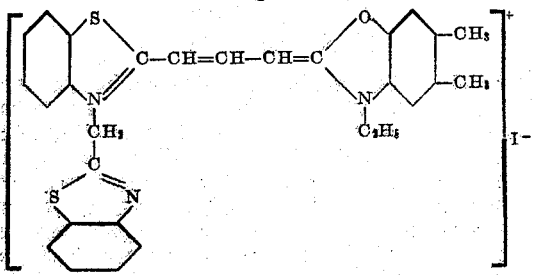

Three grams each of 2-$\beta$-acetanilido vinyl-5,6-dimethyl benzoxazole ethiodide and 2-methyl-3-(2-benzothiazolyl methyl) benzothiazole p-toluenesulfonate prepared according to Example IV were dissolved in 90.0 cc. of pyridine to which 0.5 cc. of triethylamine was added and the mixture heated on a steam bath for 15 minutes. The reaction mixture was cooled and diluted with an equal volume of water and allowed to stand at room temperature. The dye crystals were filtered off and recrystallized twice from ethyl alcohol. The dye sensitized a silver-bromoiodide emulsion to 600 m$\mu$, with a maximum at 565 m$\mu$.

In color emulsion compositions, this dye had a speed 50–100% greater than the corresponding dye with an ethyl group attached to the benzothiazole nucleus.

Example XVI

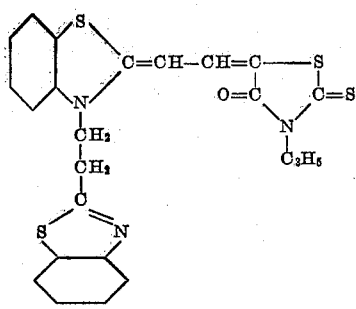

Four and eight-tenths grams of 2-methyl-3-(2-benzothiazolyl methyl) benzothiazole p-toluenesulfonate prepared according to Example VII and 2.0 grams of 3-allyl-5-acetanildo methylene rhodanine were dissolved in 150.0 cc. of isopropyl alcohol and heated to reflux on a steam bath in the presence of 0.5 cc. of triethylamine. The dye which separated was filtered off and boiled out with methyl alcohol. The sensitization data was similar to that of the dye described in Example VIII. The sensitization of photographic silver-bromoiodide emulsion was more powerful than that of an identical dye with ethyl on the nitrogen atom of the benzothiazole nucleus.

Example XVII

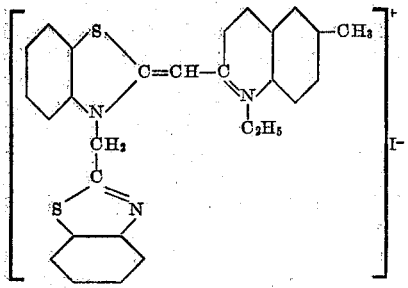

Four and eight-tenths grams of 2-methyl-3-(2-benzothiazolyl methyl) benzothiazole p-toluenesulfonate prepared according to Example IV and 3.5 grams of 2-methylmercapto-6-methyl quinoline ethiodide were dissolved in 100.0 cc. of methyl alcohol and brought to near boil. Gradually 1.0 cc. of triethylamine was added, and the mixture refluxed for 15 minutes, then allowed to cool. The yellow dye crystals which separated out were filtered off and recrystallized from methanol. The dye sensitized a silver-bromoiodide emulsion to 560 m$\mu$, with a maximum at 530 m$\mu$.

Example XVIII

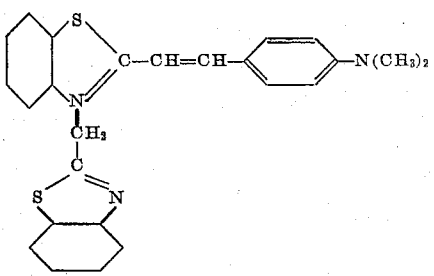

One and one-half grams of p-dimethylamino benzaldehyde and 4.8 grams of 2-methyl-3(2-benzothiazolyl methyl) benzothiazole p-toluenesulfonate prepared according to Example IV were dissolved in 30.0 cc. of pyridine and the mixture heated at an oil bath temperature measuring 110° C., for 40 minutes. The dye which formed precipitated out upon dilution with water. The dye crystals were recrystallized from methyl alcohol and have an absorption maximum in alcoholic solution at about 555 m$\mu$.

Example XIX

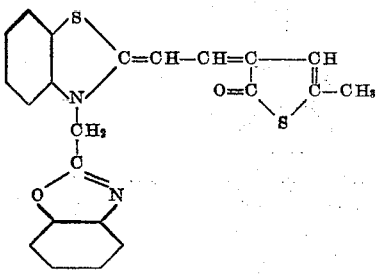

Example XIII was repeated with the exception that an equivalent quantity of 2-methyl-3-(2-benzothiazolyl methyl) benzothiazole p-toluenesulfonate, prepared according to Example VIII, was substituted for 2-methyl-3-(2-benzoxazolyl methylene) benzothiazole p-toluenesulfonate.

This dye increased the light sensitivity of a photographic emulsion considerably more than the corresponding dye with an ethyl group attached to the nitrogen atom.

While the foregoing dye salts have been prepared in the form of the preferred iodide, it is clearly apparent that they can also be prepared in the form of a bromide, chloride, perchlorate, sulfate, p-toluenesulfonate, and the like, by utilizing, as a starting component, the corresponding quaternary ammonium salt of a heterocyclic nitrogenous dyestuff intermediate of the type used in preparing cyanine dyes. Moreover, the anions of the dye salts as above obtained are readily converted into different anions by methods well-known to the art.

In the preparation of photographic gelatino-silver developing-out emulsions, such as gelatino-silver - chloride, gelatino - silver - chlorobromide, gelatino-silver-bromoiodide emulsions, and the like, containing the mono- and polymethine dyestuffs of the present invention, it is only necessary to disperse the dyestuffs in the emulsions. It is convenient to add the compounds from solutions in appropriate solvents. An alcohol, such as methanol or ethanol, is satisfactory as a solvent for the dyestuffs.

Emulsions prepared in accordance with this invention can be coated in the usual manner upon any desired support, such as cellulose nitrate, cellulose acetate, polyvinyl acetal resin, glass, paper, and the like.

The concentration of these new dyestuffs in the emulsion can vary widely, i. e., from about 1 to about 100 mg. per liter of flowable emulsion. The concentration of the dyestuff will vary according to the type of light-sensitive material in the emulsion and according to the effect desired. The suitable and most economical concentration for any given emulsion will be apparent to those skilled in the art upon making the ordinary tests and observations customarily used in the art of emulsion making.

The cyanine dye intermediates prepared in accordance with the present invention are not only useful for the preparation of cyanine dyes, but also as supersensitizing agents for photographic emulsions. In actual practice only a very small amount is added to the emulsion just prior to coating to obtain supersensitizing properties. The actual amount employed varies but on the average 3–10 mgs. are added in solution to 100 cc. of photographic emulsion containing sensitizing dyes.

This application is a division of my co-pending application Serial No. 695,559, filed September 7, 1946, now United States Patent 2,453,738.

While there have been pointed out above certain preferred embodiments of the invention, the same is not limited to the foregoing examples, illustrations or to the specific details given therein, but is capable of variations and modifications as to the reactants, proportions and conditions employed. Accordingly, it is intended that the invention be defined only by the accompanying claims, in which it is intended to include all features of patentable novelty residing therein.

I claim:

1. A cyanine dye in which at least 1 nucleus attached to the methine chain is selected from the class consisting of those of the following general formulae:

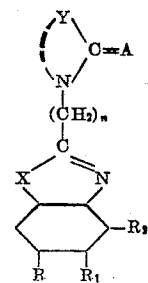

and

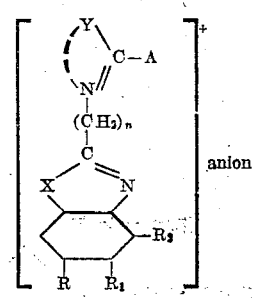

wherein A represents a methine chain of from 1 to 4 carbon atoms linked to a nuclear carbon atom of a member of the group consisting of 5- and 6-membered heterocyclic nitrogenous nuclei and 5-membered keto-heterocyclic nucleus of the type usual in cyanine dyes, R represents a member selected from the class consisting of hydrogen, halogen, aliphatic, and anilino groups, $R_1$ represents a member selected from the class consisting of hydrogen, halogen, and aliphatic groups, R and R1 together represent a methylenedioxy group, R2 represents a member selected from the class consisting of hydrogen and aliphatic groups, X represents a member selected from the class consisting of oxygen, sulfur, and selenium, Y represents the atoms necessary to complete a heterocyclic nitrogenous nucleus of the type useful in cyanine dyes, and $n$ represents a numeral ranging from 1 to 2.

2. A cyanine dye in which at least 1 nucleus attached to the methine chain has the following formula:

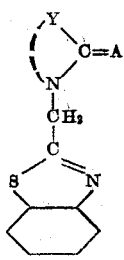

wherein A represents a methine chain of from 1 to 4 carbon atoms linked to a nuclear carbon atom of a member of the group consisting of 5- and 6-membered heterocyclic nitrogenous nuclei and 5-membered keto-heterocyclic nucleus of the type usual in cyanine dyes, and Y represents the atoms necessary to complete a heterocyclic nitrogenous nucleus of the type useful in cyanine dyes.

3. A cyanine dye in which at least 1 nucleus attached to the methine chain has the following formula:

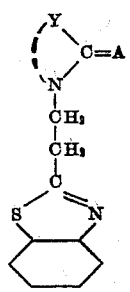

wherein A represents a methine chain of from 1 to 4 carbon atoms linked to a nuclear carbon atom of a member of the group consisting of 5- and 6-membered heterocyclic nitrogenous nuclei and 5-membered keto-heterocyclic nucleus of the type usual in cyanine dyes, and Y represents the atoms necessary to complete a heterocyclic nitrogenous nucleus of the type useful in cyanine dyes.

4. A cyanine dye in which at least 1 nucleus attached to the methine chain has the following formula:

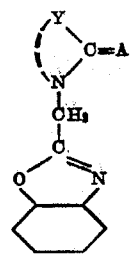

wherein A represents a methine chain of from 1 to 4 carbon atoms linked to a nuclear carbon atom of a member of the group consisting of 5- and 6-membered heterocyclic nitrogenous nuclei and 5-membered keto-heterocyclic nucleus of the type usual in cyanine dyes, and Y represents the atoms necessary to complete a heterocyclic nitrogenous nucleus of the type useful in cyanine dyes.

5. A cyanine dye characterized by the following formula:

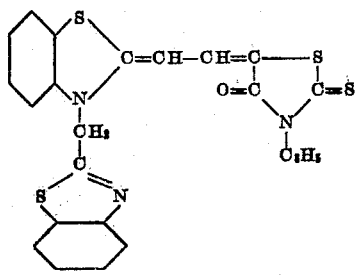

6. A cyanine dye characterized by the following formula:

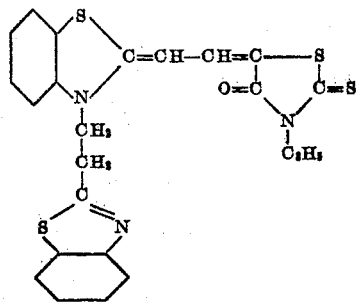

7. A cyanine dye characterized by the following formula:

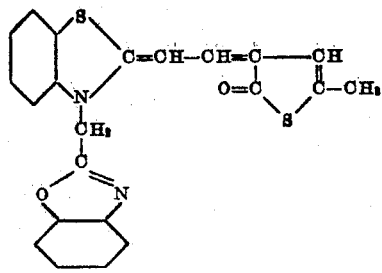

ALFRED W. ANISH.

No references cited.